United States Patent [19]

Tominaga

[11] Patent Number: 4,616,066

[45] Date of Patent: Oct. 7, 1986

[54] VINYL OR ACRYLIC POLYMER-MODIFIED EPOXY RESIN

[75] Inventor: Akira Tominaga, Hiratsuka, Japan

[73] Assignee: Kansai Paint Co., Ltd., Amagasaki, Japan

[21] Appl. No.: 784,251

[22] Filed: Oct. 4, 1985

[30] Foreign Application Priority Data

Oct. 8, 1984 [JP] Japan ................................ 59-209926

[51] Int. Cl.$^4$ ........................ C08F 8/00; C08L 61/04; C08L 63/00; C08L 69/00
[52] U.S. Cl. .................................. 525/109; 525/117; 525/524; 528/101; 528/103; 528/205
[58] Field of Search ...................... 525/109, 117, 524; 528/101, 103, 205

[56] References Cited

U.S. PATENT DOCUMENTS

| | | | |
|---|---|---|---|
| 3,432,465 | 3/1969 | De Acetis et al. | 528/101 |
| 4,251,414 | 2/1981 | Nakada et al. | 528/103 X |
| 4,259,395 | 3/1981 | Yasui et al. | 528/205 X |
| 4,371,665 | 2/1983 | Hino et al. | 525/109 |
| 4,374,963 | 2/1983 | Morgan et al. | 525/524 X |
| 4,486,571 | 12/1984 | Holubka | 525/109 X |
| 4,543,406 | 9/1985 | Otsuki et al. | 525/117 X |
| 4,547,553 | 10/1985 | Lubowitz et al. | 528/205 X |

Primary Examiner—Lucille M. Phynes
Attorney, Agent, or Firm—Wenderoth, Lind & Ponack

[57] ABSTRACT

A vinyl or acrylic polymer-modified epoxy resin comprising a reaction product of
(A) an epoxy group-containing vinyl or acrylic polymer,
(B) a bisphenol compound, and
(C) a diglycidyl ether of a bisphenol compound.

10 Claims, No Drawings

VINYL OR ACRYLIC POLYMER-MODIFIED EPOXY RESIN

This invention relates to a novel modified epoxy resin. More specifically, this invention relates to a vinyl or acrylic polymer-modified bisphenol-type epoxy resin not only possessing superior corrosion resistance and adhesion but also excelling in such properties as pliability, weatherability and resistance to cissing; as well as to the use of such a resin in coating compositions.

The bisphenol-type epoxy resins are being widely used in coating materials and adhesives as a resinous binder excelling in rust preventive property and adhesion to the substrate. They however have such shortcomings as being poor in their pliability and weatherability and tend to under cissing. For improving on these shortcomings, modification by means of various polymers have been suggested, an example being that of reacting a carboxyl or amino group-containing polymer with the epoxy resins. The suggestions made hitherto are however in all instances not fully satisfactory, for they are not able to resolve the foregoing shortcomings all at the same time and some of them cause a reduction in the rust preventive property and adhesion of the resin.

The present invention provides a bisphenoltype epoxy resin that has solved the aforesaid shortcomings without causing a decline in the adhesion and rust preventive property of the resin.

There is thus provided in accordance with this invention a vinyl or acrylic polymer-modified epoxy resin comprising a reaction product of (A) an epoxy group-containing vinyl or acrylic polymer with (B) a bisphenol compound and (C) a diglycidyl ether of a bisphenol compound.

The vinyl or acrylic polymer-modified epoxy resin of this invention has at least partially a structure in which a bisphenol-type epoxy resin is combined (grafted) to a vinyl or acrylic polymer through the intermediary of a bisphenol compound, and a remarkable feature of the modified resin of this invention resides in the fact that the properties of the epoxy resin, i.e. its superior corrosion resistance and adhesion, and the properties of the vinyl or acrylic polymer, i.e. its excellent pliability, weatherability and resistance to cissing, are both demonstrated.

The term "polymer", as used herein, includes not only the homopolymers but also the copolymers.

The resin of this invention will now be more fully described.

(A) Epoxy group-containing vinyl or acrylic polymer

This polymer has a main chain composed of a vinyl or acrylic polymer and contains at least one epoxy group. While there are imposed no particular restrictions as to its molecular weight, monomeric composition and epoxy equivalent and can be broadly varied in accordance with the classes of the hereinafter described bisphenol compound and diglycidyl ether of a bisphenol compound used and the properties to be desired in the resulting reaction product. In general, suitably used is one having a number average molecular weight ranging from about 500 to about 10,000, preferably from about 1000 to about 5000. On the other hand, it is desirable to choose the monomeric composition such that the average Sp value of the resulting polymer falls within the range of 8.0 to 11.0, preferably 9.0 to 10.0. Further, the average glass transition temperature (Tg) of the resulting polymer is advantageously chosen such that it ranges from $-40°$ to $40°$ C., and especially $-20°$ to $20°$ C. If the average Sp value is without this range, the compatibility of the resulting polymer is impaired. On the other hand, if the average Tg is outside the above range, the physical properties, especially plasticity, become poor. The "average Sp value", as used herein, is a value calculated by the empirical formula $Sp = \Sigma Wn/Spn$ where $Wn$ is the weight percent of n monomers, and $Spn$ is the Sp value of n monomers. On the other hand, the "average glass transition temperature" is a temperature calculated by the empirical formula $1/Tg = \Sigma Wn/Tgn$ where $Tg$ is the glass transition temperature (absolute temperature) of the polymer, $Wn$ is the weight fraction of n monomers, and $Tgn$ is the glass transition temperature (absolute temperature) of n monomers.

In this invention, preferably usable epoxy group-containing vinyl or acrylic polymers (A) include, for example (i) the polymers containing the structural units of (meth)acrylic acid glycidyl esters and (ii) epoxidized products of polymers containing the structural units of butadiene.

(i) The polymers containing the structural units of (meth)acrylic acid glycidyl esters include such copolymers of glycidyl acrylate or glycidyl methacrylate with other copolymerizable monomers. Monomers copolymerizable with glycidyl acrylate or glycidyl methacrylate are, for example, as follows:

(a) Esters of acrylic acid or methacrylic acid, e.g., $C_1$ to $C_{18}$ alkyl esters of acrylic acid or methacrylic acid such as methyl acrylate, ethyl acrylate, propyl acrylate, isopropylacrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_2$ to $C_{18}$ alkoxyalkyl esters of acrylic acid or methacrylic acid such as methoxybutyl acrylate, methoxybutyl methacrylate, methoxyethyl acrylate, methoxyethyl methacrylate, ethoxybutyl acrylate and ethoxybutyl methacrylate; $C_2$ to $C_8$ hydroxyalkyl esters of acrylic or methacrylic acid such as hydroxyethyl acrylate, hydroxyethyl methacrylate, hydroxypropyl acrylate and hydroxypropyl methacrylate; aminoalkyl (meth)acrylates such as N,N-dimethylaminoethyl (meth)acrylate, N,N-diethylaminoethyl (meth)acrylate, N-t-butylaminoethyl (meth)acrylate and N,N-dimethylaminopropyl (meth)acrylate; (meth)acrylamides such as (meth)acrylamide, N-methyl (meth)acrylamide, N-ethyl(meth)acrylamide, N-butyl (meth)acrylamide and N,N-dimethyl (meth)acrylamide.

(b) Aromatic vinyl compounds such as styrene, alpha-methylstyrene, vinyltoluene and p-chlorostyrene.

(c) Polyenes such as butadiene and isoprene.

(d) Other monomers such as acrylonitrile and methacrylonitrile.

These monomers may be used either singly or in combination of two or more.

The polymerization of the foregoing monomers can be carried out by methods known per se, for example the solution, emulsion and suspension polymerization techniques.

As polymers containing the (meth)acrylic acid glycidyl ester structural unit that are especially preferably usable in this invention, there can be mentioned such copolymers as glycidyl methacrylate/butyl acrylate or 2-ethylhexylacrylate/styrene copolymer and methyl methacrylate/hydroxyethyl or hydroxypropyl (meth)acrylate copolymer.

Also the polymers containing the (meth)acrylic acid glycidyl ester structural unit which are advantageously usable in this invention have usually an epoxy equivalent ranging from 500 to 5,000, preferably 750 to 3,000.

(ii) The polymers containing the butadiene structural unit include the polybutadiene and the polymers obtained by copolymerizing butadiene (the butadiene component accounting for at least 40% by weight, preferably 60% by weight of the total monomers) with such other copolymerizable monomers as the olefins, for example ethylene and propylene; dienes, for example isoprene, chloroprene and cyclopentadiene; aromatic vinyl compounds, for example styrene, alpha-methylstyrene and vinyltoluene; and acrylonitrile and methacrylonitrile. The epoxidation of these polymers can be carried out by per se known oxidation techniques. For example, the epoxidation can be readily performed at 20° to 60° C. using an oxidizing agent such as a peracetic acid or acetic acid-hydrogen peroxide in the presence or absence of a solvent.

The epoxidized product of a polymer containing the butadiene structural unit thus prepared desirably has an epoxy equivalent of usually 150 to 1500, and more preferably 200 to 800. The equivalent of an active epoxy group may however be about three or four times the above epoxy equivalent.

The epoxidized products of butadiene structural unit-containing polymers that can be used with especial advantage in this invention are the epoxidized product of polybutadiene, epoxidized product of a butadiene/acrylonitrile copolymer and epoxidized product of a butadiene/styrene copolymer.

(B) Bisphenol compound

The bisphenol compounds that can be conveniently used in this invention include those having the following general formula

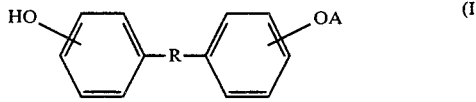

wherein R is a lower alkylene group, sulfonyl group or carbonyl group or oxygen atom. Specific examples are bis(4-hydroxyphenyl)methane, bis(4-hydroxyphenyl)-1,1-ethane, bis(4-hydroxyphenyl)-2,2-propane, bis(4-hydroxyphenyl)-1,1-isobutane, 4,4'-dihydroxydiphenyl ether and 4,4'-dihydroxydiphenylsulfone, of which especially preferred is bis(4-hydroxyphenyl)-2,2-propane.

(C) Diglycidyl ether of a bisphenol compound

As diglycidyl ethers of bisphenol compounds that can be suitably used in this invention, included are those of the following general formula hydroxyphenyl)methane, bis(4-hydroxyphenyl)-1,1'-ethane, bis(4-hydroxyphenyl)-2,2-propane, bis(4-hydroxyphenyl)1,1-isobutane, 4,4'-dihydroxydiphenyl ether and 4,4'dihydroxydiphenylsulfone, of which especially preferred is the diglycidyl ether of bis(4-hydroxyphenyl)-2,2-propane. Commercially available products are, for example the epoxy resins of Shell Chemical Company:

Epikote 828 (bisphenol A type, average molecular weight about 380, epoxy equivalent about 190), Epikote 1001 (bisphenol A type, average molecular weight about 950, epoxy equivalent about 475), and Epikote 1002 (bisphenol A type, average molecular weight about 1300, epoxy equivalent about 650).

The reaction of the epoxy group-containing vinyl or acrylic polymer (A) with the bisphenol compound (B) and the diglycidyl ether of a bisphenol compound (C) can be carried out by the following methods:

(a) A method comprising reacting the polymer (A) with the bisphenol compound (B) and then reacting the resulting product with the diglycidyl ether of a bisphenol compound (C);

(b) A method of reacting the polymer (A), the bisphenol compound (B) and the diglycidyl ether of a bisphenol compound (C) at the same time; or (c) A method comprising partially reacting in advance the bisphenol compound (B) with the diglycidyl ether of a bisphenol compound (C) and thereafter reacting the resulting partially reacted product with the polymer (A).

The reactions described in (a), (b) and (c), above, can be caused to proceed almost quantitatively by heating the reactants at about 100° to 250° C., preferably 130° to 180° C., in the presence or absence of a catalyst. Usable as catalyst are those known as ringopening catalysts of the epoxy group such as the tertiary amines, tertiary amine salts, quaternary ammonium salts, $BF_3$.amine complex and trialkyl phosphites. Again, the various solvents of the alcohol, ketone, ether and hydrocarbon types can be suitably used in carrying out the reaction.

The proportion in which the epoxy group-containing polymer (A), bisphenol compound (B) and diglycidyl ether of a bisphenol compound (C) are reacted in the aforesaid reactions can be varied over a broad range depending upon the class of the polymer (A) used and the properties to be desired in the reaction product but, in general, it is desired that the weight ratio of the epoxy group-containing polymer (A) component to the epoxy resin component formed by the reaction between the bisphenol compound (B) and diglycidyl ether of a bisphenol compound (C) comes within the range of 50/50 to 5/95, preferably 30/70 to 10/90. More specifically, it is desired that for avoiding the gelation of the resin the ratio of the components (A), (B) and (C) be chosen such that the number of equivalents of the reactive groups (epoxy group and phenolic hydroxyl group) become $(B)/(A) \geq 2$ and $(C)/[(B)-(A)] > 1$. In this case, not all of

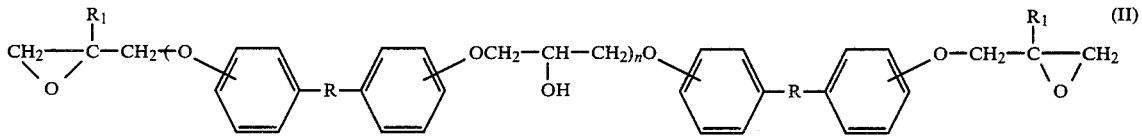

wherein $R_1$ is hydrogen atom or methyl group, R has the same significance as in formula (I) but need not be same as in formula (I), and n is 0 to 3, preferably 0 to 1. Specific examples are the diglycidyl ethers of bis(4- the epoxy groups are necessarily reactive groups.

There is thus obtained a vinyl or acrylic polymer-modified epoxy resin having a structure in which a bisphenol-type epoxy resin is combined (grafted) to a vinyl or acrylic polymer through the intermediary of a bisphenol compound.

Advantageously, the epoxy equivalent of this resin ranges from about 500 to about 5,000, preferably from about 750 to about 3,000, while its number average molecular weight ranges from about 1,000 to 10,000, preferably about 1,500 to about 6,000.

The vinyl or acrylic polymer-modified epoxy resin may, at times, contain an unreactd epoxy group-containing vinyl or acrylic polymer and/or a reaction product of a bisphenol compound and a glycidyl ether of a bisphenol compound to an extent that the compatibility of the resin is not impaired. Thus, the terminology "vinyl or acrylic polymer-modified epoxy resin", as used herein, includes such cases where such a polymer and/or reaction product is contained.

The vinyl or acrylic polymer-modified epoxy resin can be used as such in adhesives or coating compositions in combination with known curing agents such as amines, acid anhydrides and acid hydrazides.

The vinyl or acrylic polymer-modified epoxy resin can also be used as a cationic electrodeposition coating composition. In this case, cationic groups such as an amine salt or onium salt are introduced into the resin by reacting at least a part of the possibly present epoxy groups with a primary, secondary or tertiary amine. The cationic group-introduced resin can then be used as a cationic electrodeposition coating composition in combination with known curing agents such as blocked isocyanates, active esters, and active carbamates. When the resin of this invention is to be used as a cationic electrodeposition composition, it is rendered into an aqueous dispersion by partially neutralizing the primary, secondary and/or tertiary amine groups contained in the resin with an organic or inorganic acid such as acetic acid, lactic acid and formic acid. The neutralization is preferably performed in a range of 0.1 to 0.7 equivalent, more preferably 0.2 to 0.5 equivalent of the amine group. The pH of the resulting aqueous dispersion usually ranges from 3 to 9, preferably 5 to 7. It is desired that the resin concentration be from 3 to 30% by weight, preferably 5 to 15% by weight.

If desired, a pigment may be added to the aqueous dispersion. Any pigment that is usually used in electrodeposition coating compositions can be used. Usable are, for example the coloring pigments such as red iron oxide, titanium white and carbon black; extender pigments such as talc, clay and mica; and rustproof pigments such as chromates, strontium chromates and basic lead silicate. The amount in which these pigments are used is optional.

A small amount of known surface active agents usually used in cationic electrodeposition coating compositions (e.g. the nonionic surface active agents) may also be added to the aqueous dispersion, if desired.

The per se known method and apparatus that have been employed hitherto in carrying out the cationic electrodeposition coating technique can be used in coating the object to be coated using this aqueous dispersion. In such a case, the object to be coated is used as the cathode, and a carbon plate is preferably used as the anode. While there are imposed no particular restrictions as to the electrodeposition coating conditions to be employed, in general the electrodeposition is desirably carried out with stirring at a bath temperature of 20° to 30° C., a voltage of 100 to 400 V, preferably 200 to 300 V, a current density of 0.01 to 3 A/dm$^2$, an electricity charging time of 1 to 5 minutes, an electrode surface area ratio (anode/cathode) of 2/1 to ½, and a distance between the electrodes of 10 to 100 cm.

The coated film deposited on the cathode can, after riusing, be cured by baking at about 150° to about 180° C.

Further, the vinyl or acrylic polymer-modified epoxy resin of this invention can also be used in electron beam curing-type coating compositions by the introduction into the resin of an unsaturated group by esterifying the possibly present epoxy groups with an unsaturated carboxylic acid such as (meth)acrylic acid.

The following examples will serve to illustrate the present invention more fully. In the examples the parts are all on a weight basis.

EXAMPLE 1

Xylene (50 parts) was heated at 140° C., after which a mixed solution consisting of 20 parts of styrene, 20 parts of n-butyl acrylate, 30 parts of n-butyl methacrylate, 20 parts of 2-hydroxypropyl methacrylate, 10 parts of glycidyl methacrylate and 5 parts of azobisisobutyronitrile was added to the xylene at 140° C. over the course of 2 hours. After aging the mixture for 1 hour, 10 parts of azobisdimethylvaleronitrile was added over the course of 30 minutes at the same temperture, followed by aging the mixture for a further 1 hour. There was thus obtained an epoxy group-containing acrylic polymer solution having a number average molecular weight of about 2700 as analyzed by GPC and an epoxy equivalent of about 1600 (calculated as solids; this condition will apply equally hereinafter).

After adding 98.8 parts of bisphenol A to the polymer solution obtained above, the mixture was reacted for about 90 minutes at 150° C. to make its epoxy value substantially 0. This was followed by adding 253 parts of bisphenol A diglycidyl ether (trade name: EPIKOTE 828 EL, a product of Yuka Shell Co., Ltd.) and 0.1 part of dimethylbenzylamine and carrying out the reaction at 140° C. for about 3 hours to give an acrylic polymer-modified epoxy resin solution having an epoxy equivalent of about 900.

EXAMPLE 2

Two hundred parts of an epoxidized polybutadiene having an epoxy equivalent of 205 and a viscosity at 25° C. of about 1000 poises (trade name: E-1000-8, a product of Nippon Petrochemical Co., Ltd.), 194 parts of bisphenol A and 40 parts of xylene were dissolved by heating, after which they were reacted at 180° C. for about 1.5 hours until the epoxy equivalent became a value of 685. This was followed by the addition of 400 parts of EPIKOTE 828 EL and 0.04 part of triphenyl phosphite and carrying out the reaction at 160° C. until the epoxy equivalent became about 500 to give a polybutadiene-modified epoxy resin solution.

EXAMPLE 3

Bisphenol A (191.5 parts) was added to 210 parts of a polymer having an epoxy equivalent of 1450 and a viscosity at 25° C. of about 2000 poises obtained by polymerizing 60 parts of butadiene, 30 parts of acrylonitrile and 10 parts of glycidyl methacrylate by the per se known emulsion polymerization method. The mixture was then reacted at 180° C. for about 1.5 hours until the epoxy value became 0. This was followed by adding 530 parts of EPIKOTE 828 EL and at 140° C. 10.6 parts of monoethanolamine methyl isobutyl ketone ketimine, after which the reaction was carried out until the epoxy equivalent rose to about 1000 to give a butadiene copolymer-modified epoxy resin solution.

Comparative Example 1

An acrylic polymer was obtained by carrying out the reaction under the same conditions as in Example 1 but using 10 parts of methyl methacrylate instead of 10 parts of glycidyl methacrylate. To the polymer thus obtained was mixed and dissolved 350 parts of a bisphenol A-type epoxy resin having an epoxy equivalent of 950 (trade name: EPIKOTE 1004, a product of Yuka Shell Co., Ltd.) to give an acrylic polymerepoxy resin mixture.

Comparative Example 2

475 parts of a bisphenol A-type epoxy resin having an epoxy equivalent of 475 (trade name: EPIKOTE 1001, a product of Yuka Shell Co., Ltd.) was dissolved in 95 parts of xylene, after which 85 parts of a terminal amino group-containing butadiene/acrylonitrile copolymer (trade name: HYCAR ATBN 1300×16, a product of B. F. Goodrich Company) was mixed therewith.

Test for evaluating performance

Diethylaminopropylamine was added as curing catalyst to each of the resins (solutions) obtained in the foregoing five examples in an amount of 5 parts per 100 parts of the resinous solids content, and the resulting mixture was immediately coated on a zinc phosphate-treated steel plate and baked at 80° C. for 30 minutes using a hot air circulating dryer. There was thus formed a coated film having a thickness of about 40 microns. On evaluation of its performance, the results shown in the following table were obtained.

TABLE 1

| | Test Items | | | |
|---|---|---|---|---|
| | Resistance to salt water spray for 1000 hrs (JIS-Z-2371) | Salt water resistance* (5% saline solution 50° C. 20 days) | Erichsen value (JIS-Z-2247) | Impact strength (JIS-K-5400) |
| Example 1 | Passed test | 0 | 7< | 50< |
| Example 2 | Passed test | 0 | 7< | 50< |
| Example 3 | Passed test | 5 | 7< | 50< |
| Comparative Example 1 | Passed test | 20 | 5 | 30 |
| Comparative Example 2 | Failed test | 40 | 7< | 50< |

*Shown by the percentage of area stripped by means of a cellophane tape.

EXAMPLE 4

180 Parts of an epoxidized polybutadiene having an epoxy equivalent of about 245 and a number average molecular weight of about 1800 (EC-1800-6.5, a product of Nippon Petrochemical Co., Lte.) was dissolved in 88.5 parts of methyl isobutyl ketone. After adding 191.5 parts of bisphenol A to the resulting solution, the mixture was reacted at 160° C. until an epoxy equivalent of about 680 was reached. EPIKOTE 828 EL (399 parts) was then added followed by the addition of 114.4 parts of monoethanolamine methyl isobutyl ketone ketimine, after which the reaction was carried out at 130° C. for 2 hours. A partially blocked diisocyanate obtained in advance by reacting at 60° C. 312.5 parts of diphenylmethane diisocyanate and 274 parts of ethylene glycol monohexyl ether until an isocyanate value of 89.5 (mg NCO/g solids content) was reached was then added, and the reaction was carried out at 120° C. until a rise in viscosity ceased. This was followed by diluting the reaction mixture by the addition of 147 parts of ethylene glycol monobutyl ether to give a cationic electrodeposition coating resin having a solids content of 87% and an amine value of 42 (mg KOH/g solids content).

Dibutyltin dilaurate (2.8 parts) was admixed with 115 parts of the resin obtained above, which was then neutralized by the addition of 1.4 parts of acetic acid and 2 parts of lead acetate and then dispersed in water to give an emulsion having a resinous solids content of 15%. After stirring the emulsion overnight at room temperature, the emulsion was coated by electrodeposition on a zinc phosphate-treated steel plate at a bath temperature of 28° C., and baked at 180° C. for 30 minutes to obtain a coated film having a thickness of about 20 microns. The performance of the coated film was as follows:

Resistance to salt water spray (JIS-Z-2371): Passed 1,000-hrs test.
Salt water resistance (5% saline solution, 50° C., 20 days): 0%
Erichsen value (JIS-Z-2247): 7 mm<
Impact strength (JIS-K-5400): 50 cm<

EXAMPLE 5

An acrylic polymer-modified epoxy resin solution was obtained in the same manner as in Example 1 but using 100 parts of ethylene glycol monobutyl ether instead of 50 parts of xylene. To 566.8 parts of the thus obtained modified epoxy resin solution was added 133.5 parts of diethylenetriamine methyl isobutyl ketone ketimine, after which the reaction was carried out at 90° C. until the water-soluble amine value became 3 or less (mg KOH/g solids content). Water (27 parts) and 76.5 parts of propylene carbonate were then added, and the mixture was reacted at 80° C. until the decline of the amine value ceased to give a cationic electrodeposition coating resin having a solids content of 71.4% and an amine value of 48.5 (mg KOH/g solids content).

Lead 2-ethylhexanoate (2.6 parts) was admixed with 140 parts of the resin obtained above, after which the mixture was neutralized with 1.9 parts of acetic acid and dispersed in water to give an emulsion having a solids content of 15%.

After stirring the emulsion overnight at room temperature, the emulsion was electrodeposited on a zinc phosphate-treated steel plate at a bath temperature of 28° C., and baked at 170° C. for 20 minutes to obtain a coated film having a thickness of about 20 microns. The performance of the coated film was as follows:

Resistance to salt water spray (JIS-Z-2371): Passed 1,000-hrs test.
Salt water resistance (5% saline solution, 50° C., 20 days): 0%
Erichsen value (JIS-Z-2247): 5 mm<
Impact strength (JIS-K-5400): 50 cm<

What is claimed is:

1. A vinyl or acrylic polymer-modified epoxy resin comprising a reaction product of
   (A) an epoxy group-containing vinyl or acrylic polymer,
   (B) a bisphenol compound, and
   (C) a diglycidyl ether of a bisphenol compound.

2. A resin according to claim 1 wherein the epoxy group-containing vinyl or acrylic polymer (A) is a polymer containing the structural units of (meth)acrylic acid glycidyl ester.

3. A resin according to claim 2 wherein the polymer containing the structural units of (meth)acrylic acid glycidyl ester has an epoxy equivalent ranging from 500 to 5,000.

4. A resin according to claim 1 wherein the epoxy group-containing vinyl or acrylic polymer (A) is an epoxidized product of a polymer containing the structural units of butadiene.

5. A resin according to claim 4 wherein the epoxidized product of a polymer containing the structural units of butadiene has an epoxy equivalent ranging from 150 to 1,500.

6. A resin according to claim 1 wherein the bisphenol compound (B) is bis(4-dihydroxyphenyl)-2,2-propane.

7. A resin according to claim 1 wherein the diglycidyl ether of a bisphenol compound (C) is a diglycidyl ether of bis(4-dihydroxyphenyl)-2,2-propane.

8. A resin according to claim 1 which comprises introducing a cationic group to at least part of the possibly present epoxy groups.

9. A coating composition containing the vinyl or acrylic polymer-modified epoxy resin defined in claim 1.

10. The use of the vinyl or acrylic polymer-modified epoxy resin of claim 1 in a cationic electrodeposition coating composition.

* * * * *